United States Patent [19]

Znaiden

[11] 4,374,236
[45] Feb. 15, 1983

[54] ELASTOMERS AND PROCESS FOR THEIR PREPARATION

[75] Inventor: Alexander P. Znaiden, Sloatsburg, N.Y.

[73] Assignee: Avon Products, Inc., New York, N.Y.

[21] Appl. No.: 296,635

[22] Filed: Aug. 27, 1981

[51] Int. Cl.³ ............................................. C08L 83/06
[52] U.S. Cl. .................................. 528/26.5; 523/102; 524/773; 524/863; 524/865; 528/26
[58] Field of Search ................. 528/26, 26.5; 523/102; 524/773, 863, 865

[56] References Cited

U.S. PATENT DOCUMENTS

| | | | |
|---|---|---|---|
| 2,486,992 | 11/1949 | Sowa | 528/26 |
| 2,587,295 | 2/1952 | Doyle et al. | 528/26.5 |
| 2,605,243 | 7/1952 | Sowa | 528/26.5 |
| 2,718,508 | 9/1955 | Rauner | 528/26 |
| 3,032,529 | 5/1962 | Clark | 528/26 |
| 3,890,269 | 6/1975 | Martin | 528/14 |
| 4,051,159 | 9/1977 | Tsoucalas et al. | 523/102 |
| 4,069,178 | 1/1978 | Mikami et al. | 528/26.5 |

*Primary Examiner*—Ronald W. Griffin

[57] ABSTRACT

Elastomeric materials which are formed by curing a mixture of a carboxylic acid and/or a natural oil containing a carboxyl group and an amino alkyl dimethylpolysiloxane having alkoxy functional groups are disclosed. Curing is preferably effected by heating, generally for 24 or more hours depending on the materials used, their thickness and the desired transparency. The materials may optionally contain fillers to enhance strength. Incorporation of a fragrance in the elastomeric materials renders them useful as pomanders. The elastomers also have utility as shock cushions and coatings.

19 Claims, No Drawings

ELASTOMERS AND PROCESS FOR THEIR PREPARATION

BACKGROUND OF THE INVENTION (a) Field of the Invention

This invention relates to elastomeric materials. The materials have utility in release of volatile materials, as from pomanders, or may be employed in shock cushions and coatings.

(b) Background of the Invention

Amino functional organo polysiloxanes are known in the art. U.S. Pat. No. 3,890,269 describes a process for preparing such compounds. The polysiloxanes are characterized as useful as sizing agents, emulsifying agents, coating agents, corrosion inhibitors and impregnating or laminating agents. In some examples, the polysiloxanes are cured to friable rubbers by exposure to ambient moisture.

U.S. Pat. No. 3,890,269 further teaches that the amino functional group of the polysiloxanes may be reacted with organic or inorganic acids to form the corresponding ammonium salts. Acids specified as suitable for this purpose are acetic, oxalic, benzoic, formic, acrylic, caproic, lauric, maleic and aleic acids, among others. Formation of polyamides by reaction of amino functional polysilozanes and acids is also known in the art. Reaction of acids and amino functional polysiloxanes is also known to result in opaque gelatinous/resinous materials.

It has now been discovered that elastomers may be formed by curing mixtures of alkoxy substituted amino alkyl dimethylpolysiloxanes and carboxylic acids.

SUMMARY OF THE INVENTION

This invention provides novel elastomeric materials which comprise a cured mixture of a carboxylic acid or a carboxyl-containing natural oil and an alkoxy substituted amino alkyl dimethylpolysiloxane, preferably in a ratio of 20:80 weight percent. The mixture is preferably cured by heating the mixture at a temperature above about 120° F. until the mixture sets.

Elastomer strength may be enhanced by addition of fillers prior to curing. With or without such fillers the elastomers may be employed to cushion shock or impact. Sustained release of fragrances of other volatile materials from the cured elastomer can be accomplished by dissolving such volatile materials in the uncured mixture.

DETAILED DESCRIPTION OF THE INVENTION

In accordance with this invention elastomeric materials having utility as shock cushions, sustained release vehicles and coatings are provided, as is a method for their production. The elastomers comprise a cured mixture of a carboxyl compound, which is a carboxylic acid or a carboxyl-containing natural oil, and an amino alkyl dimethylpolysiloxane.

The amino alkyl dimethylpolysiloxanes useful in the practice of the invention must contain alkoxy functional groups. In the absence of such groups elastomer formation does not occur. Relatively greater numbers of alkoxy substituents result in improved elastomer formation. Typically the alkoxy substituents are lower alkoxy groups containing 1 to 8 carbon atoms.

Carboxylic acids which will combine with the above polysiloxanes to form elastomers may be aromatic or aliphatic, saturated or unsaturated, straight of branched. Carboxylic acids having one or more carboxylic functional groups may be employed. Specifically the following acids have been found effective in the practice of the present invention: acetic, maleic, adipic, sorbic, oxalic, caproic, caprylic, undecylenic stearic, oleic, linoleic, ricinoleic, benzoic and p-aminobenzoic acids. Where transparent elastomers are desired, caproic, caprylic, capric undecylenic, linoleic and isostearic acids, an oleic dimer, such as that sold as Dimer 1010 by Emery, or a tall oil dimer, such as that sold by Emery as Dimer 1012, are preferred for use in the present invention. Preferred acids for formation of opaque elastomers are oleic and ricinoleic acids or a ricinoleic dimer, such as that sold by NL Industries as Flexin 100. The shorter chain acids produce more brittle friable elastomers and are thus less preferred for use in the practice of the invention. A particularly preferred acid for purposes of the present invention is isostearic acid.

Elastomer formation in accordance with the present invention is believed to proceed via a crosslinking mechanism involving the carboxylic groups of the acids and the amino groups of the polysiloxanes, possibly resulting in water release from the mixture. The role of the alkoxyl groups is not fully understood. Certain materials containing other than unreacted carboxylic acid groups appear to form elastomers in accordance with the invention. Such elastomer formation may be due to the presence of free acid in the mixtures containing these carboxylic compounds. Among the materials containing nonacid carboxylic groups and forming elastomers are various natural oils containing fatty triglycerides and materials composed primarily of carboxylic esters, although pure carboxylic acid esters do not generally form elastomers. Specifically, castor oil, poppy seed oil, wheat germ oil, mink oil, jojoba oil, lanolin and lecithin form opaque elastomers in the practice of the invention. As used herein, carboxyl containing natural oils refer to materials of the above types, i.e. containing carboxylic acid and/or carboxyl groups reactive in the present invention.

Relative amounts of carboxyl compound and polysiloxane required to effect elastomer formation will vary depending on the specific materials selected. Where isostearic acid is employed with F-751 silicone fluid (SWS Silicones Corp.), which contains a polysiloxane whose molecular weight is 14,000 and has 0.14 milliequivalents of base per gram, about 1 to 30 weight percent of acid mixed with about 70 to 99 weight percent polysiloxane has been found effective for elastomer production. At 40% acid excess isostearic acid is evident on the elastomer surface. On the other hand below 10% acid the elastomer is harder and tends to pull apart. About a 20:80 acid to polysiloxane ratio has been found preferable for these two materials. At this ratio the elastomer surface evidences little excess acid and optimum tear strength, elasticity, elongation and compressibility are achieved.

The elastomeric materials of the invention can be formed from the carboxyl compounds and alkoxy substituted amino alkyl dimethylpolysiloxanes by simply mixing the carboxyl compound and siloxane and allowing the mixture to stand at ambient conditions until the mixture sets. However, it is preferred to effect curing by heating the mixture, preferably at a temperature of at least 120° F. Transparency of the elastomers is relatively decreased where curing is effected by heat greater than 140° F.

Curing times will depend not only on materials employed, but also will vary with temperature and depth of the mold. Temperatures above 120° F. accelerate curing. Increased mold depth necessitates increased cruing times. Generally at least 24–48 hours is required for curing mixtures approximately 1.25 cm thick at 120° F. Excessive heating in terms of time and temperature may result in loss of transparency and thus is avoided when forming transparent elastomers.

The elastomers of the invention set to a relatively solid form, the shape of which is generally maintained in the absence of distorting forces. This shape may be any which is desirable for a given application of the elastomers. For example, the elastomer forming mixture may simply be poured to form films or disks of varying sizes or thicknesses. Alternatively the mixture may be poured into a mold prior to curing. In this latter case the elastomer formed will have the shape of the mold employed. The elastomers of the invention are characteristically flexible, self-supporting solids which retain their shape in the absence of stress.

Elastomers formed in accordance with the invention will have varying degrees of opacity or transparency. Control of curing time and temperature result in changes in this quality of the elastomer. Further the materials employed to form the elastomers along with the nature of additives will affect the relative transparency of the elastomers. Preferably transparent elastomers are cured for at least 24 hours at about 120° F. while opaque elastomers are cured at temperatures above 140° F. in less than 24 hours.

Where a particular application of an elastomer of the invention warrants increased strength or rigidity, filler materials may be incorporated in the uncured mixture. For example, transparent nylon fibers or silicagels (e.g., syloids) might be employed to impart greater rigidity to an elastomer.

The elastomers of the invention find particular applicability as sustained release vehicles. Volatile materials combined with the acid/siloxane mixture prior to curing are released from the cured elastomer over a period of time. Addition of a fragrance to the acid/siloxane mixture thus results in production of a pomander or air-freshener upon curing. Additive material should be soluble in the mixture if a transparent elastomer is desired.

The elastomers of the invention may also be employed to cushion impact or shock. For example, resilient elastomers of the invention might be employed as inserts or supports in athletic shoes.

EXAMPLES

The amino alkyl polydimethylsiloxanes employed in the Examples are identified by their tradenames. Those materials bearing an F designation are products of SWS Silicones Corp. (Adrian, Mich.). Those designated DC are products of Dow Corning Corp. (Midland, Mich.). Specific characterizing data for certain of these materials is as follows:

F-751: Silicone fluid containing 100% amino-functional polydimethylsiloxane copolymer having alkoxy functional groups and a molecular weight of 14,000, viscosity of 500–600 (25° C.) specific gravity of 0.978 and 0.14 milliequivalents of base per gram of fluid.

F-784: Silicone fluid containing 100% amino-functional polydimethylsiloxane having alkoxy functional groups and a molecular weight of 4,000, viscosity of 50 (25° C.), specific gravity of 0.978 and 0.45 milliequivalents base/gram fluid.

F-756: Silicone fluid containing 100% amino-functional polydimethylsiloxane having alkoxy functional groups and a molecular weight of 1,300, viscosity of 20 (25° C.), specific gravity 0.978 and 1.5 milliequivalents base/gram fluids.

F-801: Silicone fluid containing 100% amino-functional dimethylpolysiloxane having a molecular weight of 16,000, viscosity of 500–600 (25° C.), specific gravity of 0.971 and 0.12 milliequivalents base/gram fluid and having no alkoxy functional groups.

DC-531: Silicone fluid, containing 50% amino-functional polydimethylsiloxane dissolved in aliphatic solvents and isopropyl alcohol having a molecular weight of 10,000, specific gravity of 0.860, viscosity of 100–500 and 0.66% amine functionality, as well as many fewer silanol (SiOH) and alkoxy functional groups.

DC-536: Silicone fluid, containing 100% amino-functional polydimethylsiloxane having a molecular weight of 2,000, specific gravity of 0.985, viscosity of 20–50 and 4% amine functionality, as well as many fewer silanol (SiOH) and alkoxy functional groups.

The following examples are illustrative of the invention.

EXAMPLE 1

The capacity of polysiloxanes (silicones) to form elastomers was evaluated by mixing 80 weight percent of the siloxane indicated in Table I with 20 weight percent isostearic acid. The mixtures were cured at 102° F. in molds of ½ inch thickness for 48 hours. The effectiveness of the polysiloxanes in elastomer formation is set forth in Table I.

TABLE I

| SILICONE | TYPE | ELASTOMER FORMATION |
|---|---|---|
| F852 | methyl alkyl polysiloxane | No |
| F851 | methyl alkyl polysiloxane | No |
| F816 | methylated functional polysiloxane | No |
| F815 | methylated functional polysiloxane | No |
| F801 | amino alkyl dimethylpolysiloxane | No |
| F784 | amino alkyl dimethypolysiloxane | Yes |
| F781 | aliphatic dimethylpolysiloxane copolymer | No |
| F756 | amino alkyl dimethylpolysiloxane | Yes |
| F751 | amino alkyl dimethylpolysiloxane | Yes |
| F225 | organo functional dimethylpolysilozane copolymer | No |
| DC200 | fully methylated linear polysiloxane | No |
| 7158* | cyclic dimethylpolysiloxane | No |
| DC472 | dimethyl trimethyl polysiloxane | No |
| XF13-593** | dimethylsiloxane glycol copolymer | No |
| DC531 | amino functional polysiloxane copolymer | Yes |
| DC536 | amino functional polysiloxane copolymer | Yes |

*Union Carbide.
**Dow Corning.

As shown in Table I only amino alkyl dimethylpolysiloxanes form elastomers. Moreover, these polysiloxanes must have alkoxy functional groups.

EXAMPLE 2

Elastomers were formed by curing mixtures comprising 80 weight percent of various aminofunctional polysiloxanes and 20 weight percent isostearic acid. Curing was effected at 120° F. for 48 hrs. in 0.5 inch molds. The results were as follows:

TABLE II

| AFPS | Elastomer Forming | Characteristics |
|---|---|---|
| DC 531 | Yes | 2-phase translucent, gummy, slow forming |
| DC 536 | Yes | Translucent, gummy, very brittle, slow forming, surface distortion due to stress |
| F751 | Yes | Transparent |
| F756 | Yes | Transparent, more rigidity than F751, surface distortion due to stress |
| F784 | Yes | Transparent, more rigidity than F751 |
| F801 | No | Remains fluid |

All amino alkyl dimethylpolysiloxanes having alkoxy substituents formed elastomers. However, those having relatively few alkoxyl groups formed translucent elastomers and set very slowly. These poorer elastomers may also be due to presence of other functional groups in these polysiloxanes. F801 which contains no alkoxyl functionality was ineffective in elastomer formation. Generally, since the elastomers formed with F751, F756 and F784 were superior to DC-531 and DC-536 will respect to elongation elasticity, tear strength and compressibility, materials of the former type are preferred.

EXAMPLE 3

The capacity of carboxylic materials to form elastomers and the qualities of the elastomers were evaluated by forming elastomers from 80 weight percent silicone F751 and 20 weight percent of the carboxylic acids specified in Table III. In some cases the acid was dissolved in an ethanol solution prior to reaction with F751. Ethanol does not alone react with F751 to form an elastomer. The mixtures of acid and silicone were cured at 120° F. for 48 hrs. in 0.5 inch molds. The nature of the elastomers formed is set forth in Table III.

The results set forth in Table III demonstrate that all carboxylic acids tested form elastomers. However, friability, elongation, tear strength, elasticity and other qualities of the elastomers are dependent on the nature of the acid employed.

EXAMPLE 4

Elastomer formation was evaluated employing mixtures of 20 weight percent natural oils and 80 weight percent silicone F-751 cured at 120° F. for 48 hrs in 0.5 inch molds. Results are tabulated in Table IV.

TABLE IV

| OIL | PRIMARY FATTY ACID TRIGLYCERIDES | | RESULT |
|---|---|---|---|
| Avocado | oleic | 68% | soft, resinous, |
| | palmitic | 15 | pourable |
| | linoleic | 10 | elastomer |
| Sesame | linoleic | 43% | elastomer |
| | oleic | 42 | |
| | palmitic | 9 | |
| | stearic | 5 | |
| Sunflower | linoleic | 66% | soft, resinous, |
| | oleic | 21 | pourable |
| | palmitic | 6 | elastomer |
| | arachidonic | 4 | |
| Peanut | oleic | 56% | elastomer |
| | linoleic | 26 | |
| | palmitic | 8 | |
| | stearic | 3 | |
| | behenic | 3 | |
| Grapeseed | linoleic | 70–75% | elastomer |
| | oleic | 16–18 | |
| | palmitic | 7–8 | |
| | stearic | 4–6 | |
| Castor | ricinoleic | 87% | elastomer |
| | oleic | 7 | |
| | linoleic | 3 | |
| Palm | palmitic | 46% | viscous, |
| | oleic | 38 | resinous, |
| | linoleic | 10 | stringy, gummy |
| Coconut | lauric | 48% | 2-phase gummy, |
| | myristic | 18 | stringy, |
| | palmitic | 9 | resinous |
| | caprylic | 8 | |
| | caproic | 7 | |

TABLE III

| Acid | Structure | Elastomer Characteristics |
|---|---|---|
| acetic | $CH_3COOH$ | brittle, friable, transparent |
| maleic (5% Ethanolic sol'n) | $HOCOCH=CHCOOH$ | brittle, friable, transparent |
| adipic (5% Ethanolic sol'n) | $HOCO-(CH_2)_4-COOH$ | soft, brittle, friable, transparent |
| sorbic (5% Ethanolic sol'n) | $CH_3CH=CHCH=CHCOOH$ | friable, transparent |
| oxalic (5% Ethanolic sol'n) | $HOCO-COOH\ 2H_2O$ | brittle friable, transparent |
| caproic | $CH_3-(CH_2)_4-COOH$ | transparent, resilient |
| caprylic | $CH_3-(CH_2)_6-COOH$ | transparent, resilient |
| capric | $CH_3-(CH_2)_8-COOH$ | opaque, resilient |
| myristic | $CH_3-(CH_2)_{12}-COOH$ | opaque, resilient |
| undecylenic | $CH_2=CH-(CH_2)_8-COOH$ | transparent, resilient |
| stearic (cured at 140° F.) | $CH_3-(CH_2)_{16}-COOH$ | opaque, resilient |
| oleic | $CH_3-(CH_2)_7-CH=CH-(CH_2)_7-COOH$ | opaque, resilient |
| linoleic | $CH_3-(CH_2)_4-CH=CH-CH_2-CH=CH-(CH_2)_7-COOH$ | transparent, resilient |
| ricinoleic | $CH_3-(CH_2)_5-CH(OH)CH_2CH=CH-(CH_2)_7-COOH$ | opaque, resilient |
| benzoic | ⟨O⟩—COOH | brittle, friable, transparent |
| PABA (5% Ethanolic sol'n) | $H_2N$—⟨O⟩—COOH | opaque, gummy sticky |
| Dimer 1010 (Emery) | oleic dimer | transparent, resilient |
| Dimer 1012 (Emery) | tall oil dimer (oleic/linoleic) | transparent, resilient |
| Flexin 100 (NL Ind.) | ricinoleic dimer | opaque, resilient |

TABLE IV-continued

| OIL | PRIMARY FATTY ACID TRIGLYCERIDES | | RESULT |
|---|---|---|---|
| | oleic | 6 | |
| Jojoba | 96% esters | | elastomer |
| | 1% free acids | | |
| Wheat Germ | linoleic | 44% | elastomer |
| | oleic | 30 | |
| | sat'd. acids | 15 | |
| | linolenic | 11 | |
| Poppy Seed | linoleic | 72% | elastomer |
| | oleic | 11 | |
| | palmitic | 10 | |
| | linolenic | 5 | |
| | stearic | 2 | |
| Mink | oleic | 41% | elastomer |
| | palmitic | 17 | |
| | palmitoleic | 17 | |
| | linoleic | 16 | |
| | myristic | 4 | |
| Lecithin | linoleic | 55% | elastomer |
| | palmitic | 12 | |
| | oleic | 10 | |
| | palmitoleic | 9 | |
| | linolenic | 4 | |
| | stearic | 4 | |
| Lanolin | primarily esters | | elastomer |

EXAMPLE 5

To evaluate the effect of relative amounts of carboxylic acid and aminofunctional polysiloxane in elastomer formation, elastomers were formed by curing various mixtures of F751 with isostearic acid. Curing was effected at 120° F. for 48 hrs in 0.5 inch molds. The results were as follows:

TABLE V

| Weight Percent Acid | | |
|---|---|---|
| Weight Percent Silicone | Elastomer | |
| 1 | 99 | yes, transparent |
| 5 | 95 | Yes, transparent |
| 10 | 90 | yes, transparent |
| 15 | 85 | yes, transparent |
| 20 | 80 | yes, transparent |
| 25 | 75 | yes, translucent |
| 30 | 70 | semi, gummy, stringy |
| Weight Percent Acid | Weight Percent Silicone | Elastomer |
| 35 | 65 | no, gummy |
| 40 | 60 | no, gummy |
| 45 | 55 | no, gummy |
| 50 | 50 | no, gummy |

EXAMPLE 6

The effect of temperature on curing time and elastomer formation was evaluated by curing mixtures of 20 weight percent isostearic and 80 weight percent F751 in 0.5 inch moulds. Curing was effected at the temperatures specified in Table VI. The results are set forth in Tables VI and VII.

TABLE VI

| Curing Temperature | Curing Time | | | | | |
|---|---|---|---|---|---|---|
| | 24 hr | 48 hr | 72 hr | 96 hr | 120 hr | 148 hr |
| A. Ambient | no, slight skin on surface | slight | ~50% complete | ~45% complete | ~90% complete | complete |
| B. 100° F. | yes, ~50% complete | ~80% complete | ~98% complete | complete | NA | NA |

TABLE VI-continued

| Curing Temperature | Curing Time | | | | | |
|---|---|---|---|---|---|---|
| | 24 hr | 48 hr | 72 hr | 96 hr | 120 hr | 148 hr |
| C. 110° F. | yes, ~65% complete | ~90% complete | complete | NA | NA | NA |
| D. 120° F. | yes, ~80% complete | ~99% complete | complete | NA | NA | NA |
| E. 140° F. | yes, ~95% complete | yes, complete | NA | NA | NA | NA |
| F. −26° F. | No | No | No | No | No | No |

TABLE VII

| Sample | Nature of Elastomer |
|---|---|
| A | slightly yellow, transparent |
| B | straw yellow, transparent |
| C | yellow, transparent |
| D | orange/yellow, transparent |
| E | deep orange, transparent |
| F | no elastomer formation |

I claim:

1. An elastomeric material comprising a cured mixture of a member of the group consisting of a carboxylic acid and a carboxyl-containing natural oil and an alkoxy substituted amino alkyl dimethylpolysiloxane.

2. The elastomer of claim 1 wherein the alkoxy substituent contains 1 to 8 carbons.

3. The elastomer of claim 1 which is transparent and wherein the carboxylic acid is selected from the group consisting of caproic, caprylic, undecylenic, linoleic and isostearic acids, oleic dimer and tall oil dimer.

4. An elastomer in accordance with claim 1 which is opaque and wherein the carboxylic acid is selected from the group consisting of oleic and ricinoleic acids, and ricinoleic dimer.

5. An elastomer in accordance with claim 1 which is opaque and wherein the natural oil is selected from the group consisting of castor oil, poppy seed oil, wheat germ oil, mink oil, lanolin, lecithin and jojoba oil.

6. The elastomer of claim 1 comprising the cured mixture of about 1 to 30 parts by weight acid or oil with about 70 to 99 parts by weight alkoxy substituted amino alkyl dimethylpolysiloxane.

7. The elastomer of claim 1 which contains a fragrance.

8. The use of the elastomer of claim 7 as a pomander.

9. The elastomer of claim 1 which contains a filler.

10. The use of the elastomer of claim 1 as a shock cushion.

11. The use of the elastomer of claim 1 as a coating.

12. A process for preparing an elastomer comprising:
(a) mixing a member of the group consisting of a carboxyl-containing natural oil and a carboxylic acid with a lower alkoxy substituted amino alkyl dimethylpolysiloxane, and
(b) curing the mixture until the mixture sets.

13. The process of claim 12 wherein curing is effected at at least 120° F. for at least 24 hours to produce a transparent elastomer.

14. The process of claim 12 wherein an opaque elastomer is formed by curing in less than 24 hours at greater than 140° F.

15. The process of claim 12 wherein a fragrance is dissolved in the uncured mixture.

16. The process of claim 12 wherein the mixture comprises 1–30 weight percent of the acid or natural oil and 70–99 weight percent of the alkoxy substituted amino alkyl dimethylpolysiloxane.

17. The process of claim 12 wherein the mixture comprises about 20 weight percent of the acid or oil and about 80 weight percent of the alkoxy substituted amino alkyl dimethylpolysiloxane.

18. The process of claim 12 wherein a filler is added to the uncured mixture.

19. The process of claim 12 wherein the curing process is effected in a mold.

* * * * *